UNITED STATES PATENT OFFICE.

MANUEL VILLEGAS, OF LOS ANGELES, CALIFORNIA.

PROCESS OF PREPARING FOOD FROM CORN.

1,262,144.  Specification of Letters Patent.  Patented Apr. 9, 1918.

No Drawing. Application filed May 17, 1917. Serial No. 169,197.

*To all whom it may concern:*

Be it known that I, MANUEL VILLEGAS, a citizen of the United Mexican States, residing at Los Angeles, in the county of Los Angeles, State of California, have invented certain new and useful Improvements in Processes of Preparing Food from Corn, of which the following is a specification.

This invention relates to an article of food and the process of making the same, by which is obtained a dry flour for bread making, and from which a dough may be made as used in the Latin-American countries for making "tortillas" or pan-cakes of different thicknesses. In the manufacture of the following described food product I make a corn flour which is highly nutritious and which possesses food value of the highest degree.

The article of food and the process of making the same is in the nature of a product which is shown and explained in my U. S. Patent No. 1,018,595, issued Feb. 27th, 1912, and is an improvement and a simplification thereon.

In the manufacture of this food article I place a certain quantity of pure corn in a receptacle and also place therein enough water so that the corn may be boiled. The water used should preferably be purified by electrolysis and a quantity of lime placed therein. I preferably use about one half of one per cent. of lime to a given quantity of water, this amount being slightly less than that which is usually required for preparing an article of food of this character. I then boil the corn for about fifteen or twenty minutes and after this operation I place the material on a flat board in a comparatively thin layer and dry the same with the use of a steam drier. The drying operation is continued for an hour or so, and the dried food product is then finely ground and sacked.

By the above mentioned process I manufacture a dry flour which contains a large nutritious value and possesses the proper qualities necessary for kneading, forming baking pan-cakes and "tortillas."

Having described my invention, I claim:

1. The herein described method of preparing and manufacturing an article of food, comprising boiling a quantity of corn in purified water containing approximately one half of one per cent. of lime, placing the boiled corn in a thin layer on a plane surface and subjecting the same to steam heat to dry it, and then grinding the dried matter, while in dry state, substantially as described.

2. The herein described method of preparing and manufacturing an article of food, comprising boiling a quantity of corn in purified water containing approximately one half of one per cent. of lime, drying the boiled corn, and then grinding the dried matter while in dry state, substantially as described.

3. The herein described method of preparing corn, comprising boiling the corn in water containing approximately one-half of one per cent. of lime, drying the boiled corn, and then grinding the dried corn while in dry state.

In witness that I claim the foregoing I have hereunto subscribed my name this 12th day of May, 1917.

MANUEL VILLEGAS.

Witness:
ELWOOD H. BARKELEW.